(12) United States Patent
Yuan et al.

(10) Patent No.: US 11,413,672 B2
(45) Date of Patent: Aug. 16, 2022

(54) APPARATUS AND METHOD FOR FORMING LARGE-SCALE THIN-WALLED RING SHELL BY HOT-PRESS BENDING WITH INTERNAL GAS PRESSURE

(71) Applicant: DALIAN UNIVERSITY OF TECHNOLOGY, Dalian (CN)

(72) Inventors: Shijian Yuan, Dalian (CN); Kailun Zheng, Dalian (CN); Zhubin He, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 65 days.

(21) Appl. No.: 17/056,878

(22) PCT Filed: Nov. 20, 2019

(86) PCT No.: PCT/CN2019/119645
§ 371 (c)(1),
(2) Date: Nov. 19, 2020

(87) PCT Pub. No.: WO2021/077514
PCT Pub. Date: Apr. 29, 2021

(65) Prior Publication Data
US 2021/0362209 A1 Nov. 25, 2021

(30) Foreign Application Priority Data
Oct. 25, 2019 (CN) .......................... 201911021735.1

(51) Int. Cl.
*B21D 9/15* (2006.01)
*B21D 9/08* (2006.01)
*B21D 9/18* (2006.01)

(52) U.S. Cl.
CPC ................. *B21D 9/15* (2013.01); *B21D 9/08* (2013.01); *B21D 9/18* (2013.01)

(58) Field of Classification Search
CPC ... B21D 9/08; B21D 9/15; B21D 9/16; B21D 9/18; B21D 7/16; B21D 7/162;
(Continued)

(56) References Cited

U.S. PATENT DOCUMENTS

| | | | |
|---|---|---|---|
| 2013/0205863 A1* | 8/2013 | Loesch | B21D 37/16 72/352 |
| 2017/0266710 A1* | 9/2017 | Ishizuka | B21D 19/08 |
| 2018/0361458 A1* | 12/2018 | Ishizuka | B21D 19/08 |

FOREIGN PATENT DOCUMENTS

| | | |
|---|---|---|
| CN | 1792493 A | 6/2006 |
| CN | 202427832 U | 9/2012 |

(Continued)

*Primary Examiner* — Teresa M Ekiert
(74) *Attorney, Agent, or Firm* — Carter, DeLuca & Farrell LLP; George Likourezos

(57) ABSTRACT

The present disclosure discloses an apparatus and a method for forming a large-scale thin-walled ring shell by hot-press bending with internal gas pressure. The method comprises: welding a first head and a second head to the pipe; arranging a first electrode and a second electrode at the two ends of the pipe; charging compressed gas to the heated sealed pipe assembly; placing the sealed pipe assembly between the convex part of the first die and the concave part of the second die, controlling the temperatures of the first and second dies to perform press bending; increasing the gas pressure in the bent sealed pipe assembly, to attach the bent sealed pipe assembly to the die cavity profile; discharging the compressed gas, cutting the first head, second head and extra material to obtain a formed ring shell segment; welding formed ring shell segments to obtain a large-scale thin-walled ring shell.

3 Claims, 4 Drawing Sheets

(58) Field of Classification Search
CPC ...... B21D 7/165; B21D 37/16; B21D 26/033; B21D 26/045; B21D 26/049
See application file for complete search history.

(56) References Cited

FOREIGN PATENT DOCUMENTS

| | | |
|---|---|---|
| CN | 106180345 A | 12/2016 |
| CN | 109158458 A | 1/2019 |
| CN | 109304388 A | 2/2019 |
| CN | 109909395 A | 6/2019 |
| CN | 110064689 A | 7/2019 |
| JP | 2009220141 A | 10/2009 |

* cited by examiner

APPARATUS AND METHOD FOR FORMING LARGE-SCALE THIN-WALLED RING SHELL BY HOT-PRESS BENDING WITH INTERNAL GAS PRESSURE

CROSS-REFERENCE TO RELATED APPLICATIONS

This application claims the benefit of and priority to International Application No.: PCT/CN2019/119645, filed Nov. 20, 2019 which claims priority to Chinese Patent Application No. 201911021735.1, filed with the China National Intellectual Property Administration (CNIPA) on Oct. 25, 2019, the entire contents of each application are incorporated by reference herein.

TECHNICAL FIELD

The present disclosure relates to the technical field of metal forming and manufacturing, and in particular to an apparatus and a method for forming a large-scale thin-walled ring shell by hot-press bending with internal gas pressure.

BACKGROUND

Large-scale thin-walled ring shells are mainly used in the fuel storage tanks of launch vehicles, hydro-turbine spiral casings, petrochemical equipment and pipelines, and have important applications in the aerospace, energy and water conservancy, petrochemical and other fields. For large-scale thin-walled ring shells, the current manufacture methods mainly include the tailor welded method, the stamping method, dieless hydro-bulging method and a rotary draw bending method.

The tailor welded method is a process which assembles several segments approximately into an elbow by welding method. The disadvantages of such a method are: easy occurrence of stress concentration, poor circulation of liquid at the welding seams, and low pressure resistance of the elbow, which constrains the application of tailor welded method only in a pipeline system at low pressure.

The stamping method is a process which forms ring half shell segments of a whole ring shell by stamping, and corrects the edge subsequently; the two half shell segments are welded to obtain a complete ring shell; the complete ring shell could be further cut into segments according to the required size to obtain elbows with different bending angles. The disadvantages of the stamping method are: 1) the stamped ring shell has a large springback, resulting in a poor dimensional accuracy, which could bring difficulties for the subsequent welding; 2) a series of high-precision die sets are needed, inducing a high manufacture cost; 3) the butt welding is difficult to be assembled, and the reliability is affected by the welding deformation.

The dieless hydro-bulging method requires to pre-weld polygonal ring shells with a polygonal cross-section or multi-end closed polygonal sector shells, the polygonal ring shells or polygonal sector shells are deformed using the given internal pressure to obtain the required ring shell, and the elbow with a required angle can be obtained by cutting the complete ring shell. However, this method has a drawback that the inner surface of this ring shell is easy to lose stability and wrinkle.

The rotary draw bending method is to form an aluminum alloy elbow from alloys with a low melting point as a filler by means of a method of draw bending or rotary bending. However, this method is limited by the size of bending equipment, and is usually only suitable for elbows with a small diameter.

In addition, aluminum alloy, magnesium alloy and titanium alloy are difficult to be bent and easy to crack due to their poor ductility at room temperature. In order to improve the ductility of pipe assemblies, they must be heated to elevated temperatures and formed thereafter. For a large-scale ring shell (such as a pipe shell with a diameter >500 mm, a ring shell with a diameter >2000 mm), if the shell is heated using a furnace, a large-volume furnace is required, resulting in a high equipment cost. If the conventional die contact heating method is adopted, the dimension of heating die is large, which results in a low heating efficiency and non-uniform temperature field. For high-temperature materials, such as titanium alloys, the heating die is required to have a good high-temperature performance, and the cost of the die material and preparation for the die is high.

SUMMARY

An objective of the present disclosure is to provide an apparatus and a method for forming a large-scale thin-walled ring shell by hot-press bending with internal gas pressure to solve the problems existing in the above prior art. According to the present disclosure, the current self-resistance heating improves the heating efficiency of pipe assemblies, avoids the limitation of conventional furnace heating caused by the size of the die, and reduces the manufacture cost.

In order to achieve the above objective, the present disclosure provides the following solutions:

An apparatus for forming a large-scale thin-walled ring shell by hot-press bending with internal gas pressure, comprising:

a sealed pipe assembly, a die with different controlled temperature zones, a first electrode, a second electrode, a power supply and a compressed gas source device, wherein the die with different controlled temperature zones comprises a first die and a second die; the convex part of the first die is arranged opposite to the concave part of the second die; the convex part of the first die is provided with a plurality of first cooling channels and a plurality of first heating devices, and both the first cooling channels and the first heating devices are used to adjust the temperature of the first die cooperatively; the concave part of the second die is provided with a plurality of second cooling channels and a plurality of second heating devices, and both the second cooling channels and the second heating devices are used to adjust the temperature of the second die cooperatively;

the sealed pipe assembly comprises a pipe, a first head and a second head; the first head and the second head are welded at the two ends of the pipe respectively; the pipe of the sealed pipe assembly is arranged between the convex part of the first die and the concave part of the second die;

the first electrode is arranged at one end of the pipe, and the second electrode is arranged at the other end of the pipe; the first electrode is connected with the anode of the power supply, and the second electrode is connected with the cathode of the power supply; the first electrode and the second electrode are powered to electrify the sealed pipe assembly to heat it, so as to heat the sealed pipe assembly to the preset forming temperature; and the compressed gas source device is connected with the first head or the second head, and the compressed gas source device is used to charge the compressed gas into the sealed pipe assembly.

In some embodiments, the compressed gas source device specifically comprises:

a compressed gas source and a gas pressure controller, wherein the gas pressure controller is connected to both the compressed gas source and the sealed pipe assembly, and the gas pressure controller is used to control the gas pressure in the sealed pipe assembly;

the compressed gas is selected from the group consisting of air, nitrogen, helium and argon; and the gas pressure in the sealed pipe assembly is 0.1-10 MPa.

In some embodiments, the sealed pipe assembly is made of an aluminum alloy, a magnesium alloy or a titanium alloy; the aluminum alloy is selected from the group consisting of 2000 series, 5000 series, 6000 series, 7000 series and 8000 series aluminum alloy; the magnesium alloy is selected from the group consisting of AZ series, RE series and ZK series magnesium alloy; the titanium alloy is selected from the group consisting of a titanium alloy and α+β titanium alloy; and the pipe has an outer diameter of 300-700 mm, and the outer diameter of the pipe is equal to the diameters of both the first and second head; the pipe has a length of 1000-2500 mm; the pipe has a wall thickness of 1-5 mm.

In some embodiments, under the condition that the sealed pipe assembly is made of an aluminum alloy or a magnesium alloy, the preset forming temperature is 300-500° C.; and under the condition that the sealed pipe assembly is made of a titanium alloy, the preset forming temperature is 650-1000° C.

In some embodiments, the temperature of the first die is not higher than that of the second die;

under the condition that the sealed pipe assembly is made of an aluminum alloy or a magnesium alloy, the temperature difference between the first and second dies is 0-200° C.; and under the condition that the sealed pipe assembly is made of a titanium alloy, the temperature difference between the first and second dies is 0-100° C.

The present disclosure further provides a method for forming a large-scale thin-walled ring shell by hot-press bending with internal gas pressure, comprising:

providing a pipe, a first head and a second head respectively according to preset parameters, welding the first head to one end of the pipe and welding the second head to the other end of the pipe to form a sealed pipe assembly, wherein the preset parameters comprises the outer diameter, length and thickness of the pipe, and the diameters of both the first and second heads;

arranging a first electrode at one end of the pipe and a second electrode at the other end of the pipe to form a closed current circuit; electrifying the sealed pipe assembly to heat it to a preset forming temperature;

charging a compressed gas into the heated sealed pipe assembly;

placing the sealed pipe assembly, in which the compressed gas has been charged, between the convex part of the first die and the concave part of the second die of a die with different controlled temperature zones, and controlling the temperature of both the first and second dies to perform a press bending, wherein the convex part of the first die is arranged opposite to the concave part of the second die;

increasing the pressure of the compressed gas in the bent sealed pipe assembly, to attach the bent sealed pipe assembly to the die cavity profile for shaping;

discharging the compressed gas in the sealed pipe assembly, and cutting the first head, the second head and extra material to obtain a formed ring shell segment; and welding a plurality of formed ring shell segments to obtain a large-scale thin-walled ring shell.

In some embodiments, the process of controlling the temperatures of the first and second dies to perform a press bending specifically comprises:

controlling the temperature of the first die not higher than that of the second die, to perform a press bending.

In some embodiments, the process of welding a plurality of formed ring shell segments to obtain a large-scale thin-walled ring shell specifically comprises:

welding a plurality of formed ring shell segments directly or after placing an insert between two adjacent ring shell segments to obtain a large-scale thin-walled ring shell.

In some embodiments, the compressed gas is selected from the group consisting of air, nitrogen, helium and argon;

the gas pressure in the sealed pipe assembly is 0.1-10 MPa;

the welding is performed by an arc welding, a laser welding, an argon arc welding or a friction stir welding; and the pipe has an outer diameter of 300-700 nm, and the outer diameter of the pipe is equal to the diameters of both the first and second heads; the pipe has a length of 1000-2500 mm; the pipe has a thickness of 1-5 mm.

In some embodiments, the sealed pipe assembly is made of an aluminum alloy, a magnesium alloy or a titanium alloy; the aluminum alloy is selected from the group consisting of 2000 series, 5000 series, 6000 series, 7000 series and 8000 series aluminum alloy; the magnesium alloy is selected from the group consisting of AZ series, RE series and ZK series magnesium alloy; the titanium alloy is selected from the group consisting a titanium alloy and α+β titanium alloy;

under the condition that the sealed pipe assembly is made of an aluminum alloy or a magnesium alloy, the preset forming temperature is 300-500° C.; under the condition that the sealed pipe assembly is made of a titanium alloy, the preset forming temperature is 650-1000° C.; and under the condition that the sealed pipe assembly is made of an aluminum alloy or a magnesium alloy, the temperature difference between the first and second die is 0-200° C.; under the condition that the sealed pipe assembly is made of a titanium alloy, the temperature difference between the first and second dies is 0-100° C.

According to the specific examples provided by the present disclosure, the present disclosure has the following technical effects:

The present disclosure provides an apparatus and a method for forming a large-scale thin-walled ring shell by hot-press bending with internal gas pressure, wherein heating the sealed pipe assembly by the current self-resistance improves the ductility of the light alloy pipe, such that the temperature of the sealed pipe assembly quickly reaches the forming temperature in a short time, which increases the heating efficiency significantly, and avoids the disadvantage of the conventional environmental furnace heating that the heating is limited by the sealed pipe assembly, and thus the manufacture cost is reduced; at the same time, a flexible internal pressure support is realized by using a compressed gas, and the press bending of the sealed pipe assembly is controlled by the first and second dies with zoned temperature distributions, so that the coordinated deformation of each deformation zone of the sealed pipe assembly is realized, with no cracks occurring in the convex surface of the sealed pipe assembly, and no wrinkles occurring at the concave side of the sealed pipe assembly.

BRIEF DESCRIPTION OF THE DRAWINGS

In order to illustrate the embodiments of the present disclosure or the technical solution in the prior art more clearly, the drawings used in the examples will be briefly introduced below. Obviously, the drawings in the following description are only some embodiments of the present disclosure, and for those skilled in the art, other drawings can be obtained according to these drawings without creative labor.

DETAILED DESCRIPTION

The technical solution in the embodiments of the present disclosure will be described clearly and completely with reference to the drawings of the embodiments of the present disclosure. Obviously, the described embodiments are only part of the embodiments of the present disclosure, not all of them. Based on the embodiments of the present disclosure, all other embodiments obtained by an ordinary skilled in the art without creative labor fall within the protection scope of the present disclosure.

An objective of the present disclosure is to provide an apparatus and a method for forming a large-scale thin-walled ring shell by hot-press bending with internal gas pressure. According to the present disclosure, the current self-resistance heating improves the heating efficiency of the pipe assembly, avoids the problem that the conventional furnace heating is limited by the size of dies and reduces the manufacture cost.

In order to make this objective, features and advantages of the present disclosure more obvious and understandable, the present disclosure will be further illustrated in detail with reference to the drawings and specific examples.

Example 1

Figure 1:
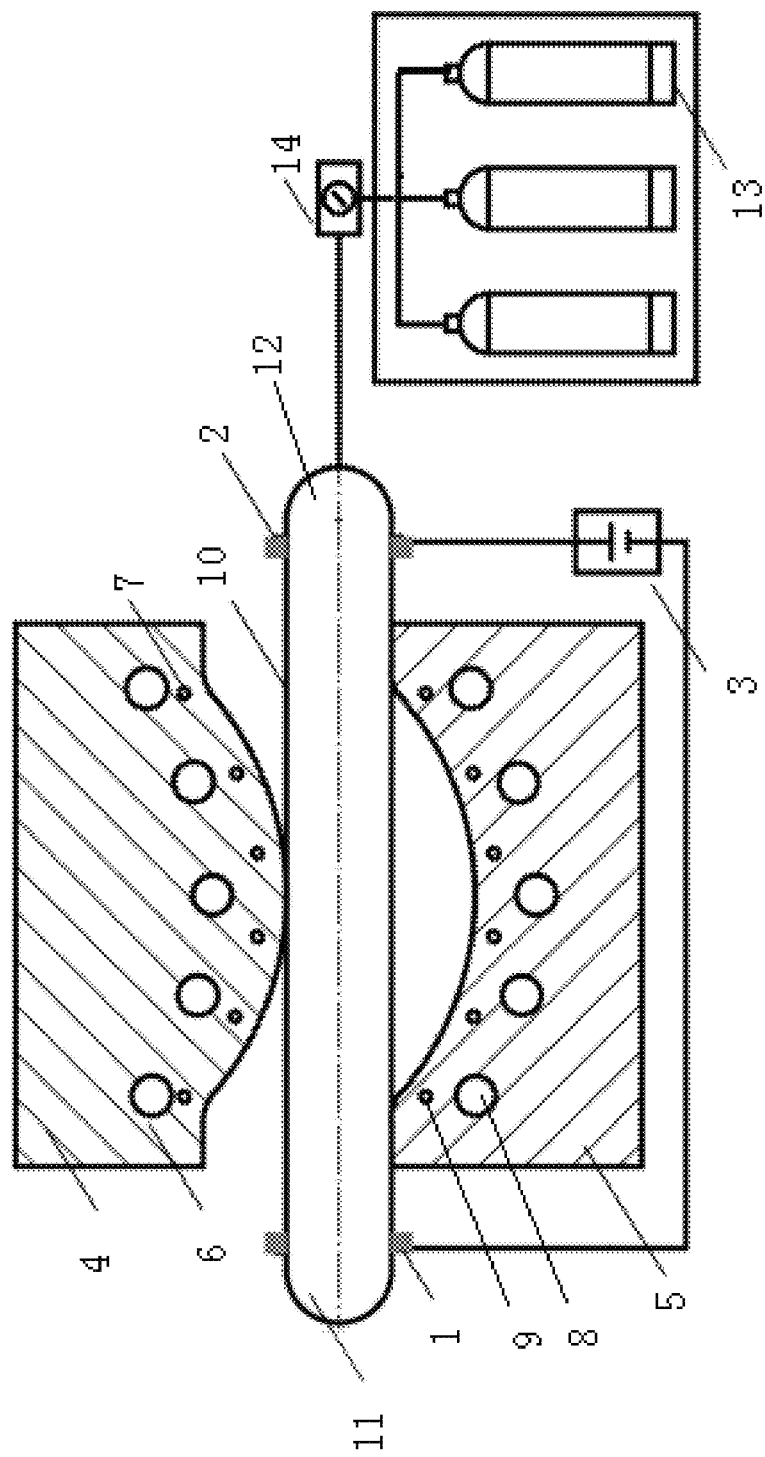
FIG. 1 is a structure diagram of an apparatus for forming a large-scale thin-walled ring shell by hot-press bending with internal gas pressure according to an example of the present disclosure.

FIG. 1 is a structure diagram of an apparatus for forming a large-scale thin-walled ring shell by hot-press bending with internal gas pressure according to an example of the present disclosure. As shown in FIG. 1, this example provides an apparatus for forming a large-scale thin-walled ring shell by hot-press bending with internal gas pressure, comprising: a sealed pipe assembly, a die with different controlled temperature zones, a first electrode 1, a second electrode 2, a power supply 3 and a compressed gas source device. The die with different controlled temperature zones comprises a first die 4 and a second die 5; the convex part of the first die 4 is arranged opposite to the concave part of the second die 5; the convex part of the first die 4 is provided with a plurality of first cooling channels 6 and a plurality of first heating devices 7, wherein the first cooling channels 6 are arranged at intervals in the convex part of the first die 4, and the first heating devices 7 are also arranged at intervals in the convex part of the first die 4, so as to realize zoned temperature control, and both the first cooling channels 6 and the first heating devices 7 are used to adjust the temperature of the first die 4 cooperatively; the concave part of the second die 5 is provided with a plurality of second cooling channels 8 and a plurality of second heating devices 9, and both the second cooling channels 8 and the second heating devices 9 are used to adjust the temperature of the second die 5 cooperatively. the sealed pipe assembly comprises a pipe 10, a first head 11 and a second head 12, wherein the first head 11 and the second head 12 are welded at the two ends of the pipe 10 respectively, and the pipe 10 of the sealed pipe assembly is arranged between the convex part of the first die 4 and the concave part of the second die 5. The first electrode 1 is arranged at one end of the pipe 10, and the second electrode 2 is arranged at the other end of the pipe 10; the first electrode 1 is connected with the anode of the power supply 3, and the second electrode 2 is connected with the cathode of the power supply 3; the first electrode 1 and the second electrode 2 are powered to electrify the sealed pipe assembly to heat it to a preset forming temperature. The first electrode 1 and the second electrode 2 are preferably annular, and the first electrode 1 and the second electrode 2 are sleeved on the pipe 10 of the sealed pipe assembly. The compressed gas source device is connected with the first head 11 or the second head 12, to transfer a compressed gas to the sealed pipe assembly.

The compressed gas source device specifically comprises a compressed gas source 13 and a gas pressure controller 14. The gas pressure controller 14 is connected with the compressed gas source 13 and the sealed pipe assembly, to control the gas pressure in the sealed pipe assembly; the compressed gas is selected from the group consisting of air, nitrogen, helium and argon; the gas pressure in the sealed pipe assembly is 0.1-10 MPa.

The sealed pipe assembly is made of an aluminum alloy, a magnesium alloy or a titanium alloy; the aluminum alloy is selected from the group consisting of 2000 series, 5000 series, 6000 series, 7000 series and 8000 series aluminum alloy; the magnesium alloy is selected from the group consisting of AZ series, RE series and ZK series magnesium alloy; the titanium alloy is selected from the group consisting of a titanium alloy and α+β titanium alloy; the pipe 10 has an outer diameter of 300-700 mm, and the outer diameter of the pipe 10 is equal to the diameters of the first head 11 and the second head 12; the pipe 10 has a length of 1000-2500 mm; the pipe 10 has a wall thickness of 1-5 mm.

Under the condition that the sealed pipe assembly is made of an aluminum alloy or a magnesium alloy, the preset forming temperature is 300-500° C.; under the condition that the sealed pipe assembly is made of a titanium alloy, the preset forming temperature is 650-1000° C.

The temperature of the first die 4 is not higher than that of the second die 5; under the condition that the sealed pipe assembly is made of an aluminum alloy or a magnesium alloy, the temperature difference between the first die 4 and the second die 5 is 0-200° C.; under the condition that the sealed pipe assembly is made of a titanium alloy, the temperature difference between the first die 4 and the second die 5 is 0-100° C.

Example 2

Figure 2:
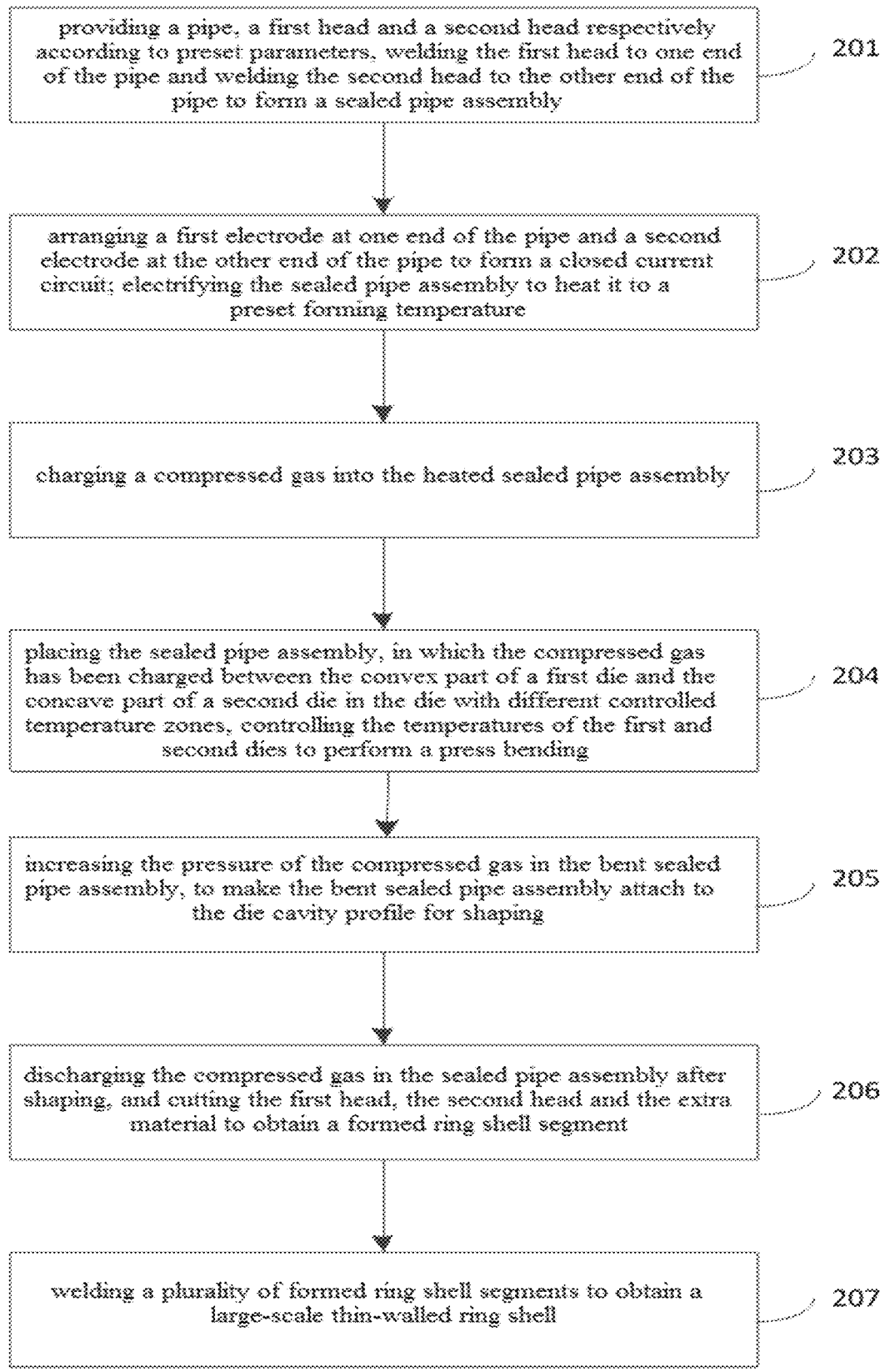
FIG. 2 is a flow chart of a method for forming a large-scale thin-walled ring shell by hot-press bending with internal gas pressure according to an example of the present disclosure.
Figure 3:
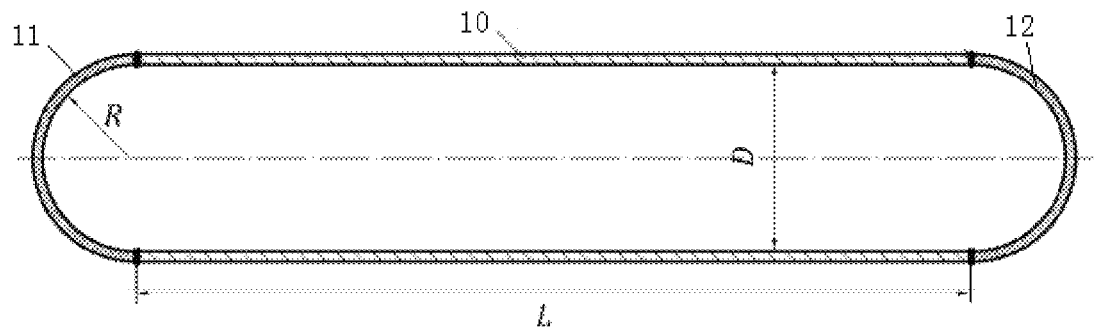
FIG. 3 is a schematic diagram of a sealed pipe assembly formed by the method for forming a large-scale thin-walled ring shell by hot-press bending with internal gas pressure according to an example of the present disclosure.

FIG. 2 is a flow chart of a method for forming a large-scale thin-walled ring shell by hot-press bending with internal gas pressure shell according to an example of the present disclosure. As shown in FIG. 2, the present disclosure provides a method for forming a large-scale thin-walled ring shell by hot-press bending with internal gas pressure, comprising:

step 201: a pipe 10, a first head 11 and a second head 12 are provided respectively according to preset parameters, wherein the first head 11 is welded to one end of the pipe 10 and the second head 12 is welded to the other end of the pipe 10 to form a sealed pipe assembly. FIG. 3 is a structure schematic diagram of a sealed pipe assembly prepared by the method for forming a large-scale thin-walled ring shell by hot-press bending with internal gas pressure according to an example of the present disclosure, wherein R represents the radius of the first head 11 and the second head 12, D represents the inner diameter of the pipe 10, and L represents the length of the pipe 10. The preset parameters comprise the outer diameter, length and wall thickness of the pipe 10, and the diameters of the first head 11 and the second head 12.

The welding is preformed by an arc welding, a laser welding, an argon arc welding or a friction stir welding. The pipe 10 has an outer diameter of 300-700 mm, and the outer diameter of the pipe 10 is equal to the diameters of the first head 11 and the second head 12; the pipe 10 has a length of 1000-2500 mm; the pipe has a wall thickness of 1-5 mm.

Step 202: a first electrode 1 is arranged at one end of the pipe 10, and a second electrode 2 is arranged at the other end of the pipe 10 to form a closed current circuit, the sealed pipe assembly is electrified to heat it to a preset forming temperature.

The sealed pipe assembly is made of an aluminum alloy, a magnesium alloy or a titanium alloy; the aluminum alloy is selected from the group consisting of 2000 series, 5000 series, 6000 series, 7000 series and 8000 series aluminum alloy; the magnesium alloy is selected from the group consisting of AZ series, RE series and ZK series magnesium alloy; the titanium alloy is selected from the group consisting of a titanium alloy and α+β titanium alloy; under the condition that the sealed pipe assembly is made of an aluminum alloy or a magnesium alloy, the preset forming temperature is 300-500° C.; under the condition that the sealed pipe assembly is made of a titanium alloy, the preset forming temperature is 650-1000° C.

Step 203: a compressed gas is charged to the heated sealed pipe assembly. The compressed gas is selected from the group consisting of air, nitrogen, helium and argon.

Step 204: the sealed pipe assembly, in which the compressed gas has been charged, is placed between the convex part of the first die 4 and the concave part of the second die 5 in a die with different controlled temperature zones, the temperatures of the first die 4 and the second die 5 are controlled to perform a press bending; the convex part of the first die 4 is arranged opposite to the concave part of the second die 5.

Figure 4:
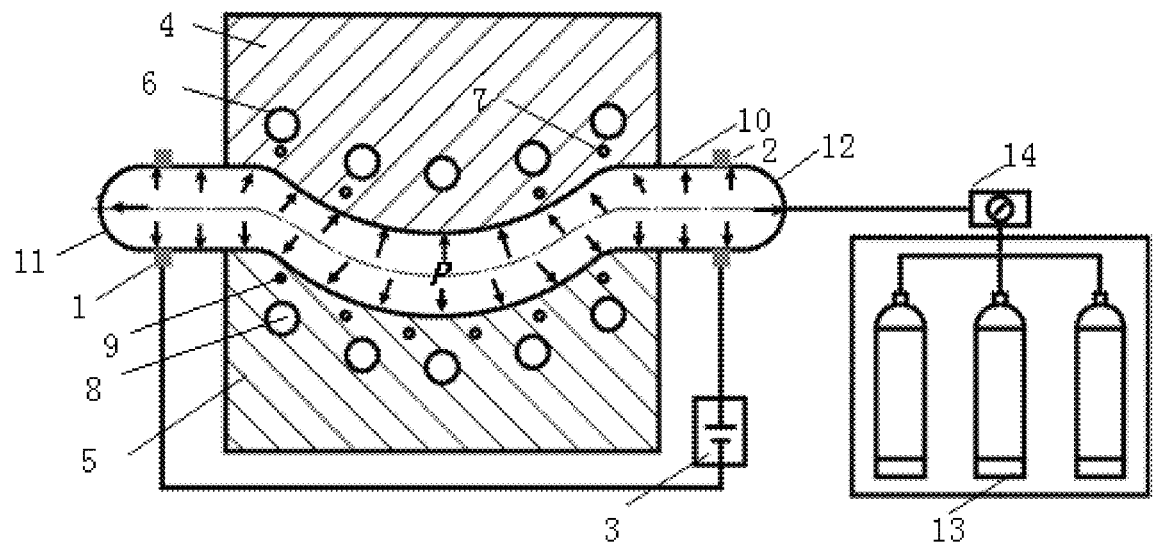
FIG. 4 is a schematic diagram of the bent state of a large-scale thin-walled ring shell formed by hot-press bending with internal gas pressure according to an example of the present disclosure.

The process of controlling the temperatures of the first die 4 and the second die 5 to perform a press bending is controlling the temperature of the first die 4 to be not higher than that of the second die 5 to perform a press bending. FIG. 4 is a schematic diagram of a press bending state of a large-scale thin-walled ring shell formed by hot-press bending with internal gas pressure according to an example of the present disclosure. Under the condition that the sealed pipe assembly is made of an aluminum alloy or a magnesium alloy, the temperature difference between the first die 4 and the second die 5 is 0-200° C.; under the condition that the sealed pipe assembly is made of a titanium alloy, the temperature difference between the first die 4 and the second die 5 is 0-100° C.

Step 205: the gas pressure in the bent sealed pipe assembly is increased, to attach the bent sealed pipe assembly to the die cavity profile for shaping.

The gas pressure in the sealed pipe assembly is 0.1-10 MPa.

Step 206: the compressed gas in the sealed pipe assembly after shaping is discharged, and the first head 11, the second head 12 and the extra material are cut to obtain a formed ring shell segment. The extra material is the excess part after removing the first head, the second head and the ring shell segment.

Step 207: a plurality of formed ring shell segments are welded to obtain a large-scale thin-walled ring shell.

Figure 5:
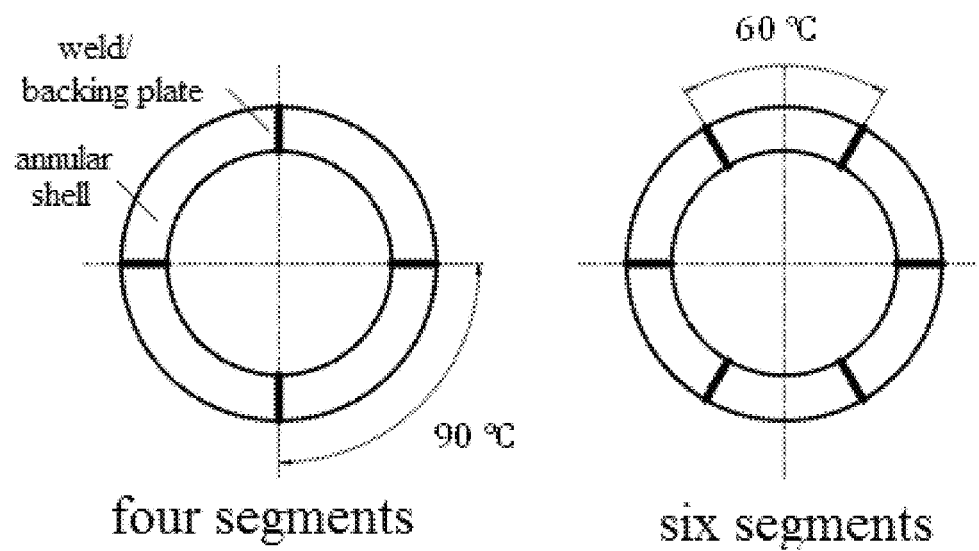
FIG. 5 shows the schematic diagram of the large-scale thin-walled ring shells according to an example of the present disclosure.

FIG. 5 shows the structure schematic diagrams of the large-scale thin-walled ring shells according to an example of the present disclosure, including 4 ring shell segments and 6 ring shell segments respectively. The process of welding a plurality of formed ring shell segments to obtain a large-scale thin-walled ring shell is carried out as follows: a plurality of formed ring shell segments are welded directly or after placing an insert between two adjacent ring shell segments to obtain a large-scale thin-walled ring shell. A large-scale thin-walled ring shell could be formed by welding 3, 4, 6 or 8 ring shell segments.

Example 3

The present example provides a method for forming a large-scale thin-walled TC4 titanium alloy ring shell by hot-press bending with internal gas pressure, wherein the ductility of the pipe is improved by the current self-resistance heating, the internal pressure support is realized by using a compressed gas, and the press bending of the pipe assembly is controlled by a die with zoned temperature distribution. The following is illustrated with reference to FIGS. 1 and 3-5, taking a large-scale TC4 titanium alloy sealed pipe assembly formed by hot-press bending with internal gas pressure for example, the pipe 10, the first head 11 and the second head 12 are all made of TC4 titanium alloy; the pipe had a diameter of 500 mm, a wall thickness of 2 mm and a length of 1400 mm; the sealed pipe assembly is heated to 850° C., the temperatures of the dies are controlled to be an isothermal state; that is to say, the temperature of the first die is equal to that of the second die. The forming method comprises the following specific steps:

The number of the ring shell segments is determined according to the design of the sealed integral ring shell, to manufacture a sealed pipe assembly. The two ends of the pipe and the heads are surface-treated and welded together to form a sealed pipe assembly. The welding is performed by a laser welding.

A first electrode 1 and a second electrode 2 are arranged at the two ends of the pipe 10 respectively to form a closed current circuit, and the pipe assembly is then electrified to heat to a preset forming temperature; the temperatures of the first and second dies are controlled by zones, and in this example, the temperatures of the first and second dies are equal to the current forming temperature. If the local thinning of the bent pipe assembly is serious under isothermal state, the temperature of the die in contact with the thinning position may be controlled to decrease, so that the material hardens, and the deformation does not concentrate here, but shifts to other softer areas (with relatively higher temperature), thus controlling the whole sealed pipe assembly to be deformed uniformly.

The forming temperature of the TC4 is preset at 850° C., and the current heating is controlled based on the following formula:

the temperature at the initial heating stage:

$$\frac{dT}{dt} = \frac{\rho}{cds^2}I^2$$

the temperature at the stable heating stage: T=KI² wherein T represents temperature; t represents time; c represents specific heat; d represents density; ρ represents conductivity; I represents electrified current; s represents cross-sectional area of the pipe; K represents heating coefficient.

A compressed gas is charged to the sealed pipe assembly to establish an internal pressure in the pipe assembly as a flexible support. The compressed gas is one of inert gases, and the internal pressure is 0.8 MPa.

The sealed pipe assembly is placed between the first and second dies for press bending, wherein the temperatures of the first and second dies are equal; in detail, after the dies are closed, the internal pressure is increased for shaping, so that the pipe is attached to the die cavity profile.

After the dies are opened, the compressed gas in the pipe assembly is discharged and the electrodes are removed. The heads at the two ends of the sealed pipe assembly and the extra material are cut to complete the forming and manufacture of a ring shell.

Multiple segments of ring shell are assembled and welded to complete the forming manufacture of a large-scale ring shell.

Example 4

This example provides a method for forming a large-scale thin-walled 2195 aluminum alloy ring shell by hot-press bending with internal gas pressure, wherein the ductility of the pipe is improved by current self-resistance heating, the internal pressure support is realized by using a compressed gas, and the press bending of the pipe assembly is controlled by a die with zoned temperature distribution. The following is illustrated with reference to FIGS. 1 and 3-5, taking a large-scale 2195 aluminum alloy sealed pipe assembly formed by hot-press bending with internal gas pressure for example, the pipe and the two heads are all made of 2195 aluminum alloy; the pipe has a diameter of 300 mm, a wall thickness of 3 mm and a length of 1000 mm; the sealed pipe assembly is heated to 400° C., the temperatures of the dies are controlled to be differential temperature state, and the maximum temperature gradient of the dies is 100° C. The forming method comprises the following specific steps:

The number of the ring shell segments is determined according to the design of the closed integral ring shell, to manufacture a sealed pipe assembly. The two ends of the pipe and the two heads are surface-treated and welded together to form a sealed pipe assembly. The welding is performed by a laser welding.

A first electrode 1 and a second electrode 2 are arranged at the two ends of the pipe 10 respectively to form a closed current circuit, and the pipe assembly is then electrified to heat it to a preset forming temperature; the temperatures of the dies are controlled by zones, wherein a cooling medium is introduced to the first die 4, and the second die 5 is heated to the preset forming temperature. The strength of the pipe material is related to the temperature; the higher the temperature, the lower the material strength. The temperatures of the first die 4 and the second die 5 are controlled to perform a press bending (the temperature of the first die 4 is controlled to be lower than that of the second die 5 to perform a press bending), wherein under the uniform internal pressure, if the temperature of the first die 4 is low and the temperature of the second die 5 is high, the sealed pipe assembly contacts with the first die 4, and then the temperature would decrease, the strength would increase, and the wrinkling would not be easy to occur.

The forming temperature of the 2195 aluminum alloy is preset at 400° C., the current heating is controlled based on the following formula:

the temperature at the initial heating stage:

$$\frac{dT}{dt} = \frac{\rho}{cds^2}I^2$$

the temperature at the stable heating stage: T=KI² wherein T represents temperature; t represents time; c represents specific heat; d represents density; ρ represents conductivity; I represents energized current; s represents cross-sectional area of the pipe; K represents heating coefficient.

After the dies are closed, a compressed gas is charged to the sealed pipe assembly to establish an internal pressure in the pipe assembly as a flexible support. The compressed gas is one of inert gases, and the internal pressure is 0.2 MPa.

The sealed pipe assembly is placed between the first and second dies for press bending, wherein the first and second dies had different temperatures; after the dies are closed, the internal pressure is increased for shaping, so that the pipe is attached to the die cavity profile.

After the dies are opened, the compressed gas in the pipe assembly is discharged and the electrodes are removed. The heads at the two ends of the sealed pipe assembly and the extra material are cut to complete the forming and manufacture of the ring shell.

Multiple segments of ring shell are assembled and welded to complete the forming and manufacture of a large size ring shell.

In summary, according to the apparatus and method for forming a large-scale thin-walled ring shell by hot-press bending with internal gas pressure in the present disclosure, heating the sealed pipe assembly by the current self-resistance improves the ductility of the light alloy pipe, such that the temperature of the sealed pipe assembly quickly reaches the forming temperature in a short time, significantly improving the heating efficiency, avoiding the defect that the heating in a conventional heating furnace is limited by the pipe assembly size, and reducing the manufacture cost; at the same time, a flexible internal pressure support is realized by a compressed gas, the press bending of the sealed pipe assembly is controlled by the first and second dies with zoned temperature distributions, so as to realize the coordinated deformation of each deformation zone of the sealed pipe assembly, and the forming quality of the ring shell segment of the assembly is good, with no cracks occurring in the convex surface of the sealed pipe assembly, and no destabilizations and wrinkles occurring at the concave side of the sealed pipe assembly; the press bending strain rate of the sealed pipe assembly at high temperature is adjusted by controlling the pressing rate of the first die, and the deformation uniformity of the material is improved by the strain rate strengthening; in addition, the whole sealed pipe assembly is subjected to a press bending, which avoids residual stress and uneven performance caused by welding after conventional cold stamping plate and improves the dimensional accuracy.

In this text, the principle and implementation of the present disclosure are illustrated by specific examples, and the illustrations of the above examples are only used to help to understand the method and core ideas of the present disclosure. At the same time, for those ordinary skilled in the art, according to the idea of the present disclosure, there will be changes in the specific implementation and the application scope. In summary, the content of this specification should not be construed as limiting the present disclosure.

The above examples are provided only for the purpose of describing the present disclosure, and are not intended to limit the scope of the present disclosure. The scope of the present disclosure is defined by the appended claims. All equivalent substitutions and modifications made without departing from the spirit and principle of the present disclosure should be within the scope of the present disclosure.

What is claimed is:

1. An apparatus for forming a large-scale thin-walled ring shell by hot- press bending with internal gas pressure, comprising:
    a sealed pipe assembly, a die with different controlled temperature zones, a first electrode, a second electrode, a power supply and a compressed gas source device, wherein
    the die with different controlled temperature zones comprises a first die and a second die; a convex part of the first die is arranged opposite to a concave part of the second die; the convex part of the first die is provided with a plurality of first cooling channels and a plurality of first heating devices, and both the first cooling channels and the first heating devices are used to adjust the temperature of the first die cooperatively; the concave part of the second die is provided with a plurality of second cooling channels and a plurality of second heating devices, and both the second cooling channels and the second heating devices are used to adjust the temperature of the second die cooperatively;
    the sealed pipe assembly comprises a pipe, a first head and a second head; the first head and the second head are welded at the two ends of the pipe respectively; the pipe of the sealed pipe assembly is arranged between the convex part of the first die and the concave part of the second die;
    the first electrode is arranged at one end of the pipe, and the second electrode is arranged at the other end of the pipe; the first electrode is connected with an anode of the power supply, and the second electrode is connected with a cathode of the power supply; the first electrode and the second electrode are powered to electrify the sealed pipe assembly to heat it, so as to heat the sealed pipe assembly to a preset forming temperature; and
    the compressed gas source device is connected with the first head or the second head, and the compressed gas source device is used to charge a compressed gas to the sealed pipe assembly;
    wherein the compressed gas source device specifically comprises:
    a compressed gas source and a gas pressure controller, wherein
    the gas pressure controller is respectively connected with the compressed gas source and the sealed pipe assembly, and the gas pressure controller is used to control the gas pressure in the sealed pipe assembly;
    the compressed gas is selected from the group consisting of air, nitrogen, helium and argon; and
    the gas pressure in the sealed pipe assembly is 0.1-10 MPa;
    the sealed pipe assembly is made of an aluminum alloy, a magnesium alloy or a titanium alloy;
    the aluminum alloy is selected from the group consisting of 2000 series, 5000 series, 6000 series, 7000 series and 8000 series aluminum alloy; the magnesium alloy is selected from the group consisting of AZ series, RE series and ZK series magnesium alloy; the titanium alloy is selected from the group consisting of α titanium alloy and α+β titanium alloy; and
    the pipe has an outer diameter of 300-700 mm, and the outer diameter of the pipe is equal to the diameters of the first head and the second head; the pipe has a length of 1000-2500 mm; the pipe has a wall thickness of 1-5 mm.

2. The apparatus for forming a large-scale thin-walled ring shell by hot-press bending with internal gas pressure as claimed in claim 1, wherein
    under the condition that the sealed pipe assembly is made of an aluminum alloy or a magnesium alloy, the preset forming temperature is 300-500° C.; and
    under the condition that the sealed pipe assembly is made of a titanium alloy, the preset forming temperature is 650-1000° C.

3. The apparatus for forming a large-scale thin-walled ring shell by hot-press bending with internal gas pressure as claimed in claim 2, wherein
    the temperature of the first die is not higher than that of the second die;
    under the condition that the sealed pipe assembly is made of an aluminum alloy or a magnesium alloy, the temperature difference between the first and second dies is 0-200° C.; and
    under the condition that the sealed pipe assembly is made of a titanium alloy, the temperature difference between the first and second dies is 0-100° C.

* * * * *